US011085586B2

(12) United States Patent
Trimble et al.

(10) Patent No.: US 11,085,586 B2
(45) Date of Patent: Aug. 10, 2021

(54) REGULATED FILL STATION

(71) Applicant: Pressure Specialist, Inc., Crystal Lake, IL (US)

(72) Inventors: Raymond Trimble, Marengo, IL (US); Scot W. Tillman, Crystal Lake, IL (US); Aaron A. Stephens, Bartlett, IL (US)

(73) Assignee: Pressure Specialist, Inc., Crystal Lake, IL (US)

( * ) Notice: Subject to any disclaimer, the term of this patent is extended or adjusted under 35 U.S.C. 154(b) by 83 days.

(21) Appl. No.: 16/659,990

(22) Filed: Oct. 22, 2019

(65) Prior Publication Data

US 2020/0124235 A1 Apr. 23, 2020

Related U.S. Application Data

(60) Provisional application No. 62/748,890, filed on Oct. 22, 2018.

(51) Int. Cl.
*F17C 13/02* (2006.01)
*F17C 13/04* (2006.01)
(Continued)

(52) U.S. Cl.
CPC ............ *F17C 13/025* (2013.01); *F16K 31/50* (2013.01); *F16K 31/60* (2013.01); *F17C 5/06* (2013.01);
(Continued)

(58) Field of Classification Search
CPC .......... F16C 13/025; F16C 13/04; F16C 5/06; F16C 2270/0745; F16C 2205/0338;
(Continued)

(56) References Cited

U.S. PATENT DOCUMENTS 473,069 A 4/1892 Giessenbier
509,923 A 12/1893 Locke
(Continued)

FOREIGN PATENT DOCUMENTS

EP 0382711 A2 8/1990

*Primary Examiner* — Jessica Cahill
*Assistant Examiner* — Patrick C Williams
(74) *Attorney, Agent, or Firm* — Levenfeld Pearlstein, LLC

(57) ABSTRACT

A pressure regulator for controlling the flow of gas from a high pressure source to a low pressure device and regulating a pressure to the low pressure device includes a body having a high pressure inlet and a regulated pressure outlet. The body has a series of passages and bores including first and second regulator valve assembly bores and first and second fill valve assembly bores. The first and second regulator valve assembly bores are disposed on opposing sides of one of the passages and the first and second fill valve assembly bores are disposed on opposing sides of one of the passages. A regulator valve assembly includes a seal, a regulator valve piston, a biasing member and an adjusting plug positioned in the first regulator valve assembly bore, and a seal, a seat, a ball, a spring and a plug positioned in the second regulator valve assembly. A fill valve assembly includes a seal, a jam nut, a spring, a valve shaft, and a shaft actuator positioned in the first fill valve assembly bore and a seal, a seat, a ball, a spring and a plug positioned in the second fill valve assembly bore.

11 Claims, 3 Drawing Sheets

(51) Int. Cl.
  *F17C 5/06*    (2006.01)
  *F16K 31/60*   (2006.01)
  *F16K 31/50*   (2006.01)
  *G05D 16/10*   (2006.01)

(52) U.S. Cl.
  CPC ...... *F17C 13/04* (2013.01); *F17C 2205/0338* (2013.01); *F17C 2221/031* (2013.01); *F17C 2250/0626* (2013.01); *F17C 2260/021* (2013.01); *F17C 2270/0745* (2013.01); *G05D 16/107* (2019.01)

(58) Field of Classification Search
  CPC ........ F16C 2221/031; F16C 2250/0626; F16C 2260/021; F16K 31/60; F16K 31/50; G05D 16/107; F17C 13/025; F17C 13/04; F17C 5/06; F17C 2270/0745; F17C 2205/0338; F17C 2221/031; F17C 2250/0626; F17C 2260/021
  See application file for complete search history.

(56) References Cited

U.S. PATENT DOCUMENTS

| | | | |
|---|---|---|---|
| 1,183,920 A | 5/1916 | Wallace | |
| 2,438,231 A | 3/1948 | Schultz | |
| 2,615,287 A | 10/1952 | Senesky | |
| 2,717,096 A | 9/1955 | Henderson | |
| 2,918,081 A | 12/1959 | Lauer, Jr. | |
| 3,347,109 A | 10/1967 | Adams et al. | |
| 3,360,004 A | 12/1967 | Lewis et al. | |
| 3,474,822 A | 10/1969 | Kuhn | |
| 3,538,930 A | 11/1970 | Kowalski | |
| 3,602,250 A | 8/1971 | Neenan | |
| 3,848,631 A | 11/1974 | Fallon | |
| 3,890,999 A | 6/1975 | Moskow | |
| 3,926,208 A | 12/1975 | Hoffman | |
| 3,961,721 A | 6/1976 | Gordon | |
| 3,995,656 A | 12/1976 | Mills, Jr. | |
| 4,008,716 A * | 2/1977 | Amlong | A62B 9/02 128/205.24 |
| 4,064,890 A | 12/1977 | Collins et al. | |
| 4,168,129 A | 9/1979 | Herrnring | |
| 4,181,139 A | 1/1980 | Martini | |
| 4,194,522 A | 3/1980 | Lucas et al. | |
| 4,226,257 A | 10/1980 | Trinkwalder | |
| 4,305,423 A | 12/1981 | Adler | |
| 4,450,858 A | 5/1984 | Acomb | |
| 4,484,695 A | 11/1984 | Fallon et al. | |
| 4,648,431 A | 3/1987 | Strongert et al. | |
| 4,785,847 A | 11/1988 | Steer et al. | |
| 4,791,957 A | 12/1988 | Ross | |
| 5,036,878 A | 8/1991 | Fournillon et al. | |
| 5,086,807 A | 2/1992 | Lasnier et al. | |
| 5,123,442 A | 6/1992 | Geuy et al. | |
| 5,135,023 A | 8/1992 | Ross | |
| 5,234,026 A | 8/1993 | Patterson | |
| 5,280,778 A | 1/1994 | Kotsiopoulos | |
| 5,348,037 A | 9/1994 | Katchka | |
| 5,368,022 A | 11/1994 | Wagner | |
| 5,392,825 A | 2/1995 | Mims et al. | |
| 5,411,053 A | 5/1995 | Holt | |
| 5,497,803 A | 3/1996 | Ferrante | |
| 5,507,308 A | 4/1996 | Chambonnet | |
| 5,516,157 A | 5/1996 | Williamson | |
| 5,522,421 A | 6/1996 | Holt | |
| 5,669,369 A | 9/1997 | Scott | |
| 5,694,966 A * | 12/1997 | Holder | G05D 16/10 137/115.11 |
| 5,996,625 A | 12/1999 | Taema | |
| 6,056,006 A | 5/2000 | Hagerty | |
| 6,170,519 B1 * | 1/2001 | Carroll | G05D 16/107 137/505.42 |
| 6,186,168 B1 | 2/2001 | Schultz et al. | |
| 6,321,779 B1 | 11/2001 | Miller et al. | |
| 6,363,964 B1 | 4/2002 | Carroll | |
| 6,554,322 B2 | 4/2003 | Duong et al. | |
| 6,672,332 B2 | 1/2004 | Carroll | |
| 6,851,447 B1 | 2/2005 | Carroll | |
| 6,948,520 B2 | 9/2005 | Carroll | |
| 7,051,751 B2 | 5/2006 | Carroll | |
| 7,419,189 B2 | 9/2008 | Dickerson et al. | |
| 7,490,622 B2 | 2/2009 | Jones | |
| 7,610,937 B1 | 11/2009 | Trimble et al. | |
| 2002/0170601 A1 * | 11/2002 | Smith | G05D 16/109 137/505.42 |
| 2008/0295899 A1 | 12/2008 | Jones | |
| 2010/0175763 A1 | 7/2010 | Newman | |
| 2015/0020899 A1 * | 1/2015 | Eyring | F17C 13/04 137/544 |

\* cited by examiner

REGULATED FILL STATION

CROSS-REFERENCE TO RELATED APPLICATION DATA

This application claims the benefit of and priority to Provisional U.S. Patent Application Ser. No. 62/748,890, filed Oct. 22, 2018, titled, "REGULATED FILL STATION," the disclosure of which is incorporated herein in its entirety.

BACKGROUND

The present disclosure is directed to a regulated fill station. The fill station is used to transfer a pressurized gas from a pressurized gas source, such as a bulk storage container to another device, such as a gas storage bottle. In one use, the regulated fill station is used to transfer, in a regulated manner, a high pressure gas from a gas source to a local bottle, such as a gas cylinder, in any air-driven or pneumatic system. A contemplated use is for transferring a high pressure gas from a storage tank to a local cylinder for use with a paintball gun.

SUMMARY

A pressure regulator for controlling the flow of gas from a high pressure source to a low pressure device and regulating a pressure to the low pressure device can be used, for example to transferring a high pressure gas from a storage tank to a local cylinder for use with a paintball gun. The pressure regulator includes a body having a high pressure inlet and a regulated pressure outlet. The body has a series of passages and bores including first and second regulator valve assembly bores in communication with the inlet, and first and second fill valve assembly bores in communication with the outlet.

The first and second regulator valve assembly bores are disposed on opposing sides of one of the passages and the first and second fill valve assembly bores are disposed on opposing sides of one of the passages.

A regulator valve assembly includes a seal, a regulator valve assembly piston, a biasing member and an adjusting plug positioned in the first regulator valve assembly bore, and a seal, a seat, a ball, a spring and a plug positioned in the second regulator valve assembly bore. A fill valve assembly includes a seal, a jam nut, a spring, a stepped valve shaft, and a valve shaft actuator positioned in the first fill valve assembly bore and a seal, a seat, a ball, a spring and a plug positioned in the second fill valve assembly bore.

In an embodiment, the adjusting plug is movable so as to adjust a preset compression of the regulator valve assembly spring to set an output pressure of gas. The regulator can further include a fill knob operably mounted to the valve shaft actuator. In embodiment, the stepped valve shaft and the valve shaft actuator are movable by movement of the fill knob. The fill knob can be rotatable to move the valve shaft actuator.

In embodiments, the stepped valve shaft includes a first portion having a first diameter and a second portion having a second diameter. The second diameter can be larger than the first diameter such that when the first portion is positioned in the fill valve assembly seat, a flow path is opened at the fill valve assembly from the inlet to the outlet and when the second portion is positioned in the fill valve assembly seat, a flow path through the valve is closed at the fill valve assembly seat.

In another aspect, the pressure regulator regulates a pressure to a low pressure device at a preset pressure. The regulator includes a body having an inlet and an outlet and a plurality of passages therebetween. A regulator valve assembly is disposed in a passage of the plurality of passages downstream of the inlet and a fill valve assembly is disposed in a passage of plurality of passages between the regulator valve assembly and the outlet.

The regulator valve assembly includes a movable piston biased to an open position and closable upon a force exerted by the flow of gas from the high pressure source greater than the preset pressure. The fill valve assembly can be manually openable to allow the flow of gas to the low pressure device at the preset pressure. The regulator valve assembly can further include an adjusting plug for moving the piston to adjust the preset pressure. The regulator valve assembly can further include a seat and a ball, wherein the ball is disposed on the seat to close the regulator valve assembly.

In an embodiment, the fill valve assembly further includes a seat, and a stepped valve shaft having a first portion having a first diameter and a second portion having a second diameter, the second diameter being larger than the first diameter, and wherein when the first portion is positioned in the seat, a flow path is opened at the fill valve assembly from the inlet to the outlet and when the second portion is positioned in the seat, a flow path through the valve is closed at the fill valve assembly seat. In embodiments, the fill valve assembly further includes a shaft actuator and the fill valve is manually openable by rotation of the shaft actuator.

These and other features and advantages of the present device will be apparent from the following description, taken in conjunction with the accompanying sheets of drawings, and in conjunction with the appended claims.

DESCRIPTION OF THE DRAWINGS

The benefits and advantages of the present invention will become more readily apparent to those of ordinary skill in the relevant art after reviewing the following detailed description and accompanying drawings, wherein.

DESCRIPTION

Figure 1:
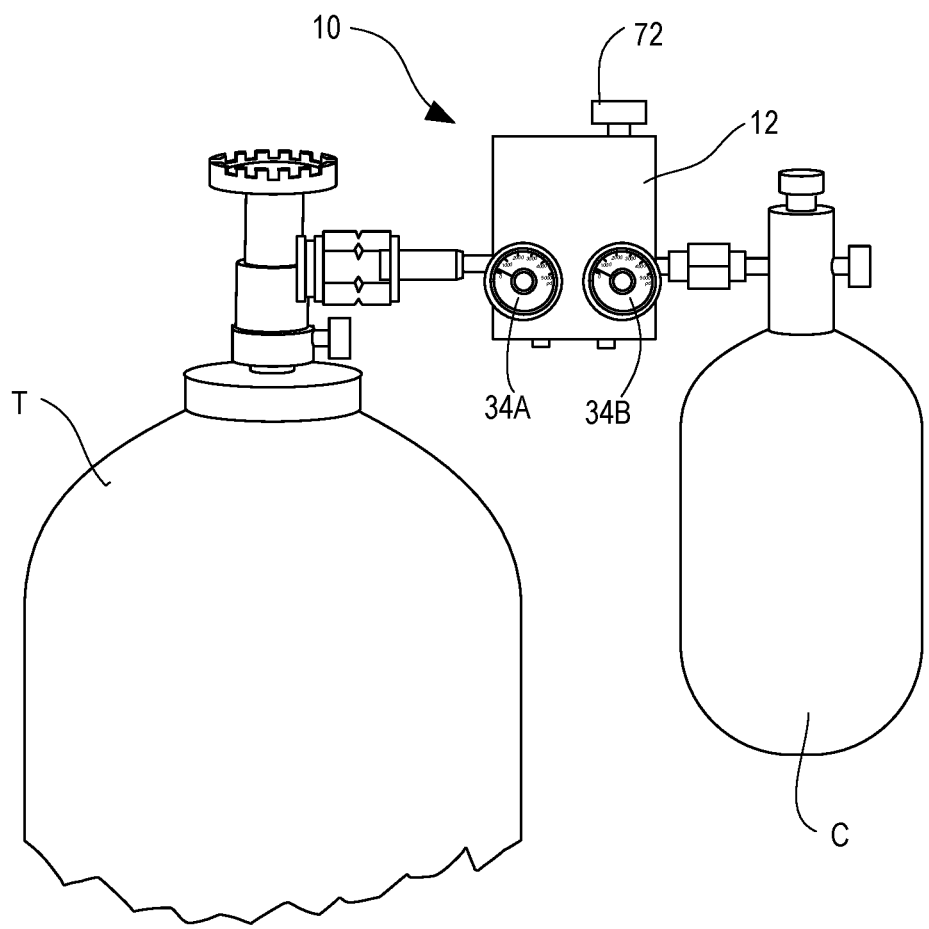
FIG. 1 illustrates an embodiment of a regulated fill station mounted between a bulk storage container and a local bottle or cylinder.

While the present disclosure is susceptible of embodiment in various forms, there is shown in the drawings and will hereinafter be described a presently preferred embodiment with the understanding that the present disclosure is to be considered an exemplification of the device and is not intended to limit the claims to the specific embodiment illustrated.

Figure 2:
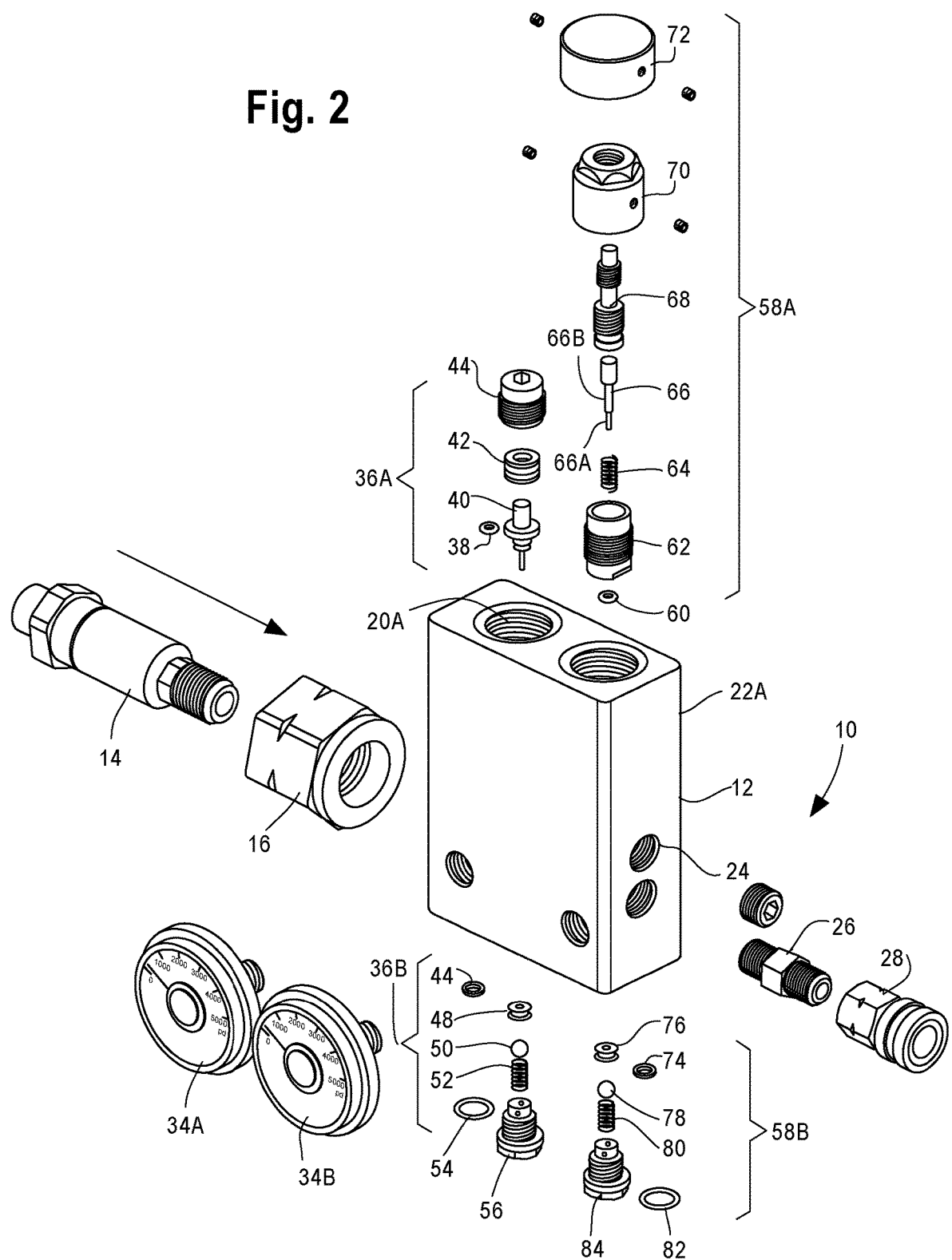
FIG. 2 is an exploded view of an embodiment of a regulated fill station.
Figure 3:
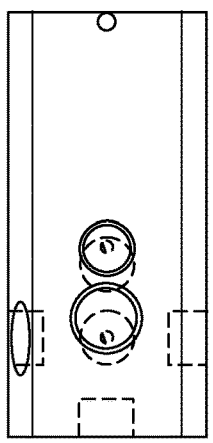
FIGS. 3-9 are various views of an embodiment a body for the regulated fill station, FIGS. 8 and 9 being cross-sectional views taken through lines 8-8 and 9-9 of FIGS. 5 and 7, respectively.
Figure 4:
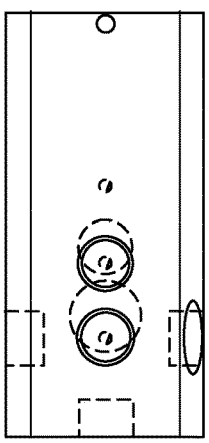
Figure 5:
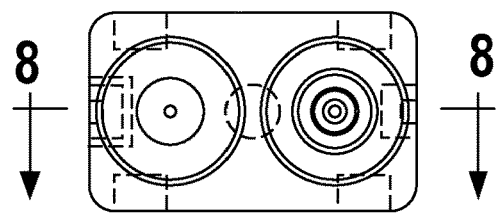
Figure 6:
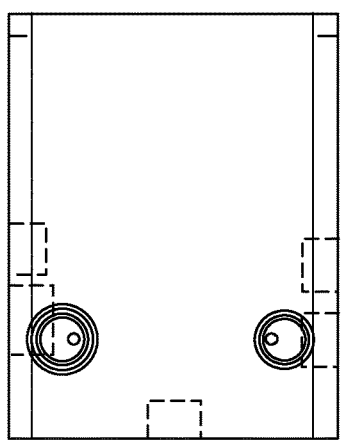
Figure 7:
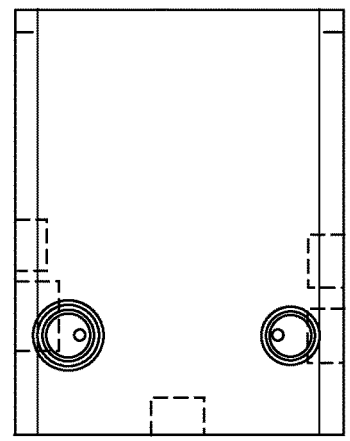
Figure 8:
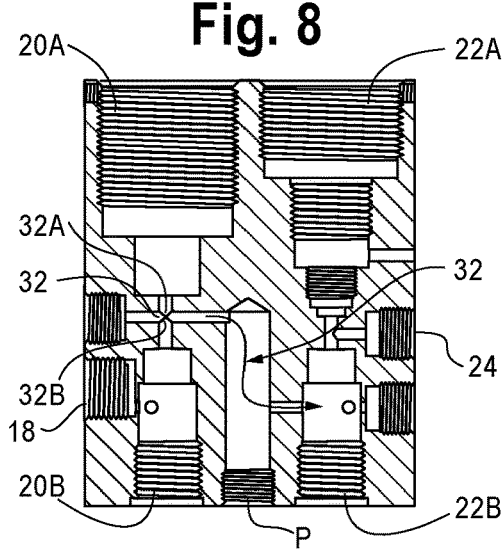
Figure 9:
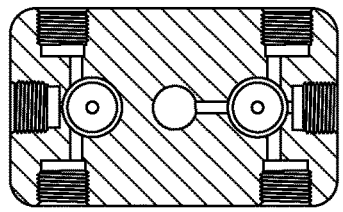

Referring to the figures, and in particular to FIG. 1, a present regulated fill station (referred to herein as fill station or station) 10 is shown. The station 10 is positioned between a bulk storage tank T and a local bottle referred to as a cylinder C. Referring now to FIGS. 2 and 3, the station 10 includes a body 12, an inlet nipple 14 and an inlet nut 16. The body includes a threaded inlet bore 18, first and second threaded regulator valve assembly bores 20A, 20B, first and second threaded fill valve assembly bores 22A, 22B, and a threaded outlet bore 24. In an embodiment, an outlet nipple 26 and a quick disconnect 28 are mounted to the outlet bore.

Referring to FIGS. 3A-3E, the body includes a series of bores, indicated generally at 30, and passages, indicated generally at 32, that communicate from the inlet bore 18 to the outlet bore 24. The body 12 also includes bores for inlet and outlet pressure gauges 34A, 34B.

The regulator 10 includes a regulator valve assembly 36 illustrated in two parts 36A and 36B. The first part 36A of the regulator valve assembly is positioned on one side of inlet passage 32A and the second part 36B of the regulator valve assembly is positioned on an opposite side of inlet passage 32A. The first part 36A includes a seal 38, a regulator valve piston 40, a biasing member 42 such as the illustrated spring washer and an adjusting plug 44 that are positioned in the first regulator valve assembly bore 20A. The second part 36B of the regulator valve assembly includes a seal 46, such as an O-ring, a seat 48, a ball 50, a spring 52, a seal 54 such as the illustrated O-ring, and a plug 56 positioned in the second regulator valve assembly bore 20B which is on an opposite side of the passage 32A. Although the illustrated regulator valve assembly first part 36A is shown with a ball 50, those skilled in the art will appreciate that a pin (not shown) or other element can be used to close the valve, and that such other elements are within the scope and spirit throughout the present disclosure.

Downstream in the flow path P, the regulator 10 further includes a fill valve assembly 58 illustrated in two parts 58A and 58B. The first part 58A of the fill valve assembly includes a seal 60, such as the illustrated O-ring, a jam nut 62, a spring 64, a stepped valve shaft 66, and a valve shaft actuator 68 that are positioned in the first fill valve assembly bore 22A. A valve cap 70 and a fill knob 12 are positioned on the valve shaft actuator 68. The second part 58B of the fill valve assembly 58 includes a seal 74 such as an O-ring, a seat 76, a ball or pin 78, a spring 80 a seal such as an O-ring, and a plug 82 positioned in the second fill valve assembly bore 22B which is on the opposite side of the passage 32B.

In operation, a high pressure gas such as compressed air, flows into the regulator 10 through the nipple 14 and into the inlet bore 18. The gas enters the passage 32A at the regulator valve assembly 36 and flows between the ball 50 and seat 48. The gas urges the piston 40 upward, off of the seat 48 against the spring 42 force, and continues through the passages 32 to the fill valve assembly 58. It is to be noted that the outlet pressure from the regulator valve assembly 36 can be adjusted to a desired regulated or outlet pressure by adjusting the adjusting plug 44 to apply more or less force on the piston 40 (by compressing or relaxing the spring 42). Moving the piston 40 inward (toward the ball 50) applies a force on the ball 50 to move it off of the seat and allow air to flow through the regulator valve assembly 36. A greater force on the piston 40 (that is, threading the adjusting plug 44 into the body 12) will move the ball 50 off of the seat, resulting in a higher outlet pressure downstream of the regulator valve assembly 36. Once the outlet pressure is set, the outlet pressure will remain at that set pressure until and unless, the outlet pressure is readjusted by threading the adjusting plug 44 into or out of the body 12 (into or out of the inlet bore 20A).

The fill valve assembly 58 functions in much the same way as the regulator valve assembly 36. Rotating the fill knob 72 in turn rotates the shaft actuator 68 moving it downward (into the body 12), which in turn urges the valve shaft 66 downward into the body 12, against the spring 64.

As the valve shaft 66 moves downward into the body 12, it urges the ball 78 off of the seat 76 to allow the flow of regulated air out of the fill station 10 through the outlet nipple 26. As best seen in FIG. 2, the valve shaft 66 is stepped. A lower part 66A of the shaft 66 has a smaller diameter and, when positioned in the seat 76, allows air to flow around the shaft lower part 66A and out of the regulator 10. When the upper part 66B of the shaft 66 (which has a larger diameter than the lower part 66A) is positioned in the seat 76 (as when the shaft actuator 68 and shaft 66 are tightened down into the body 12), the shaft upper part 66B is positioned in the seat 76 and seals, to prevent the flow of air out of the regulator 10.

In one use, the regulator 10 is connected to a high pressure source, such as a large compressed gas bulk tank T with the bulk tank valve closed. The adjusting plug 44 is threaded out to close the regulated valve assembly 36 and the fill knob 72 is rotated so as to close the fill valve assembly 58.

The bulk tank T valve is opened to pressurize the inlet side of the regulator 10 and gauge 34A will indicate the pressure of the source. The adjusting plug 44 is then tightened down to open flow into the regulator 10 and the outlet or regulated pressure is read on the regulated pressure gauge 34B. The adjusting plug 44 is tightened or loosened to adjust to the desired regulated pressure. The fill knob 72 may be opened to relieve a small amount of pressure and then closed (and may be done repeatedly) so that a finely adjusted regulated pressure is achieved. The regulated or outlet pressure is thus set.

A local bottle, such as a paint ball cylinder C is connected to the outlet at, for example, the quick disconnect fitting 28. The fill knob 72 is then rotated downward (toward the body 12) to urge valve shaft 66 to move the ball 78 off of seat 76 with the lower part 66A of the shaft 66 in the 76 seat to allow regulated air to flow out of the regulator 10 and into the cylinder C. Once the cylinder C is filled with air at the desired pressure, air will stop flowing into the cylinder C (the regulated source and cylinder are at the same pressure/ equilibrium). The fill knob 72 is then rotated to close the regulator 10. As the fill knob 72 is rotated, any pressure remaining in the regulator 10 (which is a small amount of pressurized air) is relieved as the valve shaft 66 moves away from seat 76. Air pressure relief is around the valve shaft 66, between the valve shaft 66 and the jam nut 62, and out through the valve cap 70.

It is also contemplated that the fill valve assembly 58 can be a "push to flow" configuration in which, instead of rotating the fill knob 72 to urge the shaft actuator 68 and shaft 66 into the body, the fill knob is pushed inward, into the body 12, to move the ball 78 off of the seat 76 and permit the gas to flow out of the outlet nipple 26, and that such a configuration is within the scope and spirit of the present disclosure.

All patents referred to herein, are hereby incorporated herein by reference, whether or not specifically done so within the text of this disclosure.

In the present disclosure, the words "a" or "an" are to be taken to include both the singular and the plural. Conversely, any reference to plural items shall, where appropriate, include the singular. It will also be appreciated by those skilled in the art that the relative directional terms such as upper, lower, rearward, forward, into (or in to) and out of, and like terms are for explanatory purposes only and are not intended to limit the scope of the disclosure.

From the foregoing it will be observed that numerous modifications and variations can be effectuated without departing from the true spirit and scope of the novel concepts of the present invention. It is to be understood that no limitation with respect to the specific embodiments illustrated is intended or should be inferred. The disclosure is intended to cover by the appended claims all such modifications as fall within the scope of the claims.

What is claimed is:

1. A pressure regulator for controlling the flow of gas from a high pressure source to a low pressure device and regulating a pressure to the low pressure device, comprising:
   a body having a high pressure inlet and a regulated pressure outlet, the body having a series of passages and bores including first and second regulator valve assembly bores in communication with the inlet, and first and second fill valve assembly bores in communication with the outlet, the first and second regulator valve assembly bores disposed on opposing sides of one of the plurality of passages and the first and second fill valve assembly bores disposed on opposing sides of a different one of the plurality of passages;
   a regulator valve assembly including a first regulator valve assembly seal, a regulator valve assembly piston, a regulator valve assembly biasing member and an adjusting plug positioned in the first regulator valve assembly bore, and a second regulator valve assembly seal, a regulator valve assembly seat, a regulator valve assembly ball, a second regulator valve assembly spring and a regulator valve assembly plug positioned in the second regulator valve assembly bore; and
   a fill valve assembly including a first fill valve assembly seal, a fill valve assembly jam nut, a first fill valve assembly spring, a stepped valve shaft, and a valve shaft actuator positioned in the first fill valve assembly bore and a second fill valve assembly seal, a fill valve assembly seat, a fill valve assembly ball, a second fill valve assembly spring and a fill valve assembly plug positioned in the second fill valve assembly bore,
   wherein the stepped valve shaft includes a first portion having a first diameter and a second portion having a second diameter, the second diameter being larger than the first diameter, and
   wherein when the second portion is positioned in the fill valve assembly seat, a flow path through the valve is closed at the fill valve assembly seat.

2. The pressure regulator of claim 1, wherein the adjusting plug is movable so as to adjust a preset compression of the regulator valve assembly spring.

3. The pressure regulator of claim 2, wherein adjusting a preset compression of the regulator valve assembly spring determines a preset output pressure.

4. The pressure regulator of claim 1, further including a fill knob operably mounted to the valve shaft actuator.

5. The pressure regulator of claim 4, wherein the stepped valve shaft and the valve shaft actuator are movable by movement of the fill knob.

6. The pressure regulator of claim 5, wherein the fill knob is rotatable.

7. A pressure regulator for controlling the flow of gas from a high pressure source to a low pressure device and regulating a pressure to the low pressure device at a preset pressure, comprising:
   a body having an inlet and an outlet and a plurality of passages therebetween;
   a regulator valve assembly disposed in a passage of the plurality of passages downstream of the inlet and a fill valve assembly disposed in a different passage of the plurality of passages between the regulator valve assembly and the outlet,
   wherein the regulator valve assembly includes a movable piston biased to an open position and closable upon a force exerted by the flow of gas from the high pressure source greater than the preset pressure,
   wherein the fill valve assembly is manually openable to allow the flow of gas to the low pressure device at the preset pressure, and
   wherein the fill valve assembly further includes a seat, and a valve shaft having first and second portions, the first portion having a first diameter and the second portion having a second diameter, the second diameter being larger than the first diameter, and wherein when the first portion is positioned in the seat, a flow path is opened at the fill valve assembly from the inlet to the outlet and when the second portion is positioned in the seat, a flow path through the valve is closed at the fill valve assembly seat.

8. The pressure regulator of claim 7, wherein the regulator valve assembly further includes an adjusting plug for moving the piston to adjust the preset pressure.

9. The pressure regulator of claim 7, further including a regulator valve seat and a regulator valve ball, wherein the regulator valve ball is disposed on the regulator valve seat to close the regulator valve assembly.

10. The pressure regulator of claim 7, wherein the fill valve assembly further includes a shaft actuator.

11. The pressure regulator of claim 10, wherein the fill valve is manually openable by rotation of the shaft actuator.

* * * * *